United States Patent

Wagner et al.

[11] 4,027,356
[45] June 7, 1977

[54] MEAT TENDERIZER

[75] Inventors: Richard C. Wagner, Frankfort; Ronald A. Banike, Orland Park, both of Ill.

[73] Assignee: Hollymatic Corporation, Park Forest, Ill.

[22] Filed: Oct. 29, 1975

[21] Appl. No.: 626,757

[52] U.S. Cl. ............................................. 17/25
[51] Int. Cl.$^2$ .................................... A22C 9/00
[58] Field of Search ........... 17/25, 28; 99/532, 557, 99/509

[56] References Cited

UNITED STATES PATENTS

| | | | |
|---|---|---|---|
| 3,256,801 | 6/1966 | Greenspan | 17/25 X |
| 3,651,541 | 3/1972 | Jaccard | 17/25 |
| 3,719,504 | 3/1973 | Greenspan | 17/25 X |
| 3,736,583 | 5/1973 | Smith et al. | 17/25 X |
| 3,744,089 | 7/1973 | Fetzer et al. | 17/25 |
| 3,842,464 | 10/1974 | McCord | 17/25 |

*Primary Examiner*—Robert Peshock
*Attorney, Agent, or Firm*—Wegner, Stellman, McCord, Wiles & Wood

[57] ABSTRACT

An apparatus for tenderizing meat having a plurality of knives each comprising an elongated blade including structure for reciprocating the knives to project and withdraw the cutting edge ends of the knives into and from the meat in order to sever fibers therein. The apparatus also has a blade stabilizer through which the blades extend engaging the blades intermediate their ends for supporting the blades against lateral bending which would tend to damage the blades. The apparatus also includes structure for retracting the stabilizer member relative to the blades during the final completion of the penetrating so as not to restrict the penetrating.

11 Claims, 10 Drawing Figures

MEAT TENDERIZER

BACKGROUND OF THE INVENTION

This invention relates to an apparatus for tenderizing meat in which a plurality of knives each comprising an elongated blade having a cutting end for penetrating and severing the meat and fibers therein are reciprocated into and out of the meat while it is held on a retainer with the result that any fibers such as naturally occur in grass fattened cattle, for example, are severed into short pieces by making almost undetectable cuts in the meat with the result that the meat can be cooked in the normal manner but is much more tender than normal without loss of flavor.

Many forms of apparatus for such mechanical tenderizing of meat by severing fibers into short lengths and which use elongated blades with knife ends have been proposed and appear in the prior art. Thus one such meat tenderizing apparatus which is particularly used with meats that are free of bones so that contact of the blades with bones is not a problem is U.S. Pat. No. 3,736,623 as well as certain prior patents listed and briefly discussed therein.

Another such meat tenderizing apparatus but where the meat contains bones so that the apparatus is constructed with longitudinally yieldable knife combinations so that the knives will yield and not be damaged is U.S. Pat. No. 3,842,464 and the prior art references discussed therein. Both of these patents are assigned to the assignee hereof.

Whether the mechanical tenderizers are "bone-in" or "bone-out" they employ long thin blades so as to avoid damage to the meat and to avoid changing its cooking characteristics. These long thin blades sometimes tend to bend excessively particularly where the meat is quite tough. The tenderizing apparatus of this invention provides a blade stabilizer means including a stabilizer member through which the blades extend and which engage the blades intermediate the ends thereof so as to provide a stabilizer against excessive lateral bending of the blades and thereby prevent substantial damage to the blades.

SUMMARY OF THE INVENTION

The apparatus for tenderizing meat of this invention comprises the combination of a retainer for the meat during the tenderizing which may be a conveyor for conveying the meat through a tenderizing station, a plurality of knives each comprising an elongated blade having opposite ends the one of which that is adjacent the meat at the tenderizing station comprising a cutting end for penetrating and severing the meat, means for reciprocating the knives at the tenderizing station to project and withdraw the cutting edge ends into and from the meat on the retainer with the result that each blade is subject to lateral stresses and thereby lateral bending resulting from the penetrating of the meat, a blade stabilizer member through which the blades extend at the area intermediate the opposite ends of the blades so as to support the blades against this lateral bending, means for positioning the stabilizer at a selected distance from the blade cutting ends and intermediate the opposite ends of the blades at the beginning of the penetrating to provide this lateral stability and means for retracting the stabilizer means relative to the blades during the completion of the penetrating so that the stabilizer provides substantially no interference to complete penetration of the meat by the blades.

DESCRIPTION OF THE PREFERRED EMBODIMENTS

The illustrated embodiments disclose the invention as applied to a bone-in tenderizer where each knife with its corresponding blade structure is yieldable when the knife strikes the bone in the manner described in the above prior U.S. Pat. No. 3,842,464.

Figure 1:
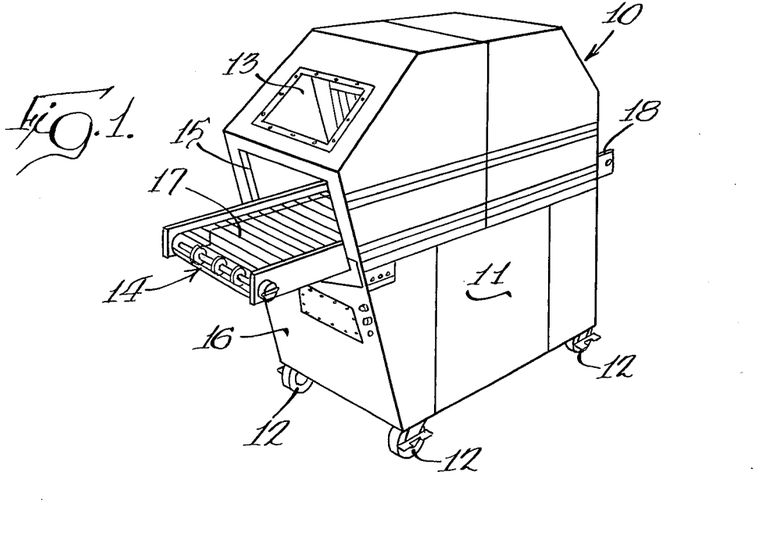
FIG. 1 is a perspective view of a meat tenderizing apparatus embodying the invention.

In the illustrated embodiments the meat tenderizer 10 comprises a cabinet 11 that is movably mounted on casters 12 in the customary manner with the cabinet 11 including a viewing window 13 at one end and the customary meat conveyor 14 extending from the cabinet 11 through an opening 15 at one end 16 of the cabinet and beneath the window 13. This conveyor 14 as shown in FIG. 1 has its forward end 17 completely exposed so that the cuts of meat to be tenderized may be placed thereon for travel through the tenderizing station and removed from the opposite end 18 of the conveyor.

Figure 2:
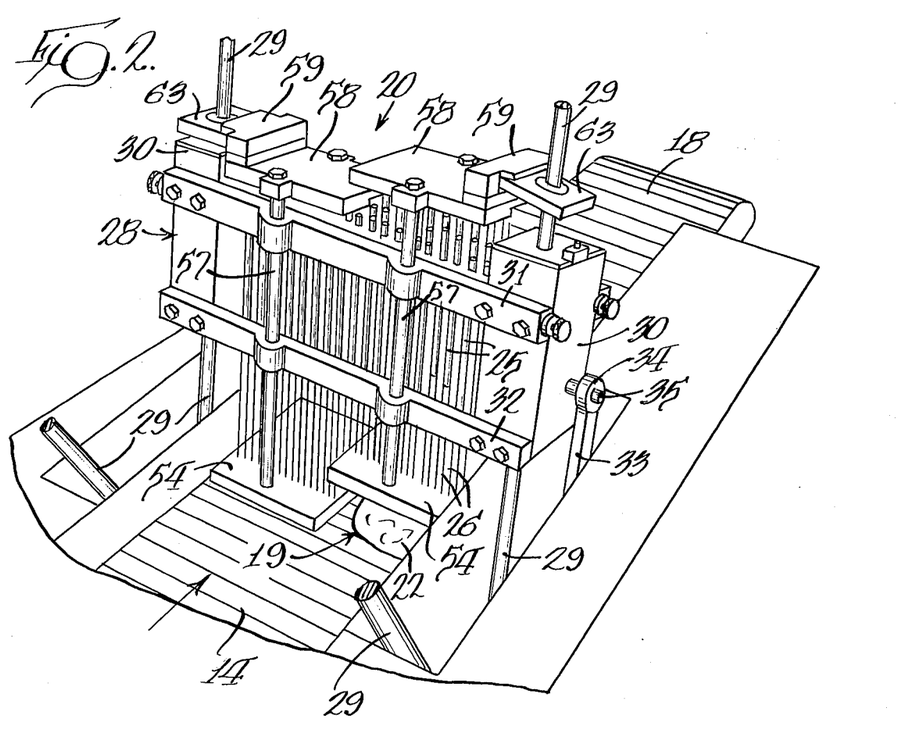
FIG. 2 is a fragmentary perspective view of one embodiment of one set of knives and the mounting and operating structure therefor of the apparatus of FIG. 1 with a second identical structure being omitted for clarity of illustration and without including the blade stabilizer means of this invention in order to illustrate an operating structure for the knives.

As is illustrated in FIG. 2 the interior of the cabinet 11 provides a tenderizing station 19 containing a pair of meat tenderizing devices 20 angled downwardly toward each other and the conveyor 14. Only one device 20 is disclosed in FIG. 2. This is described more fully in the copending application of Richard C. Wagner, one of the inventors here, Ser. No. 547,983, filed Feb. 7, 1975, now U.S. Pat. No. 3,991,439 and also assigned to the assignee hereof.

Figure 5:
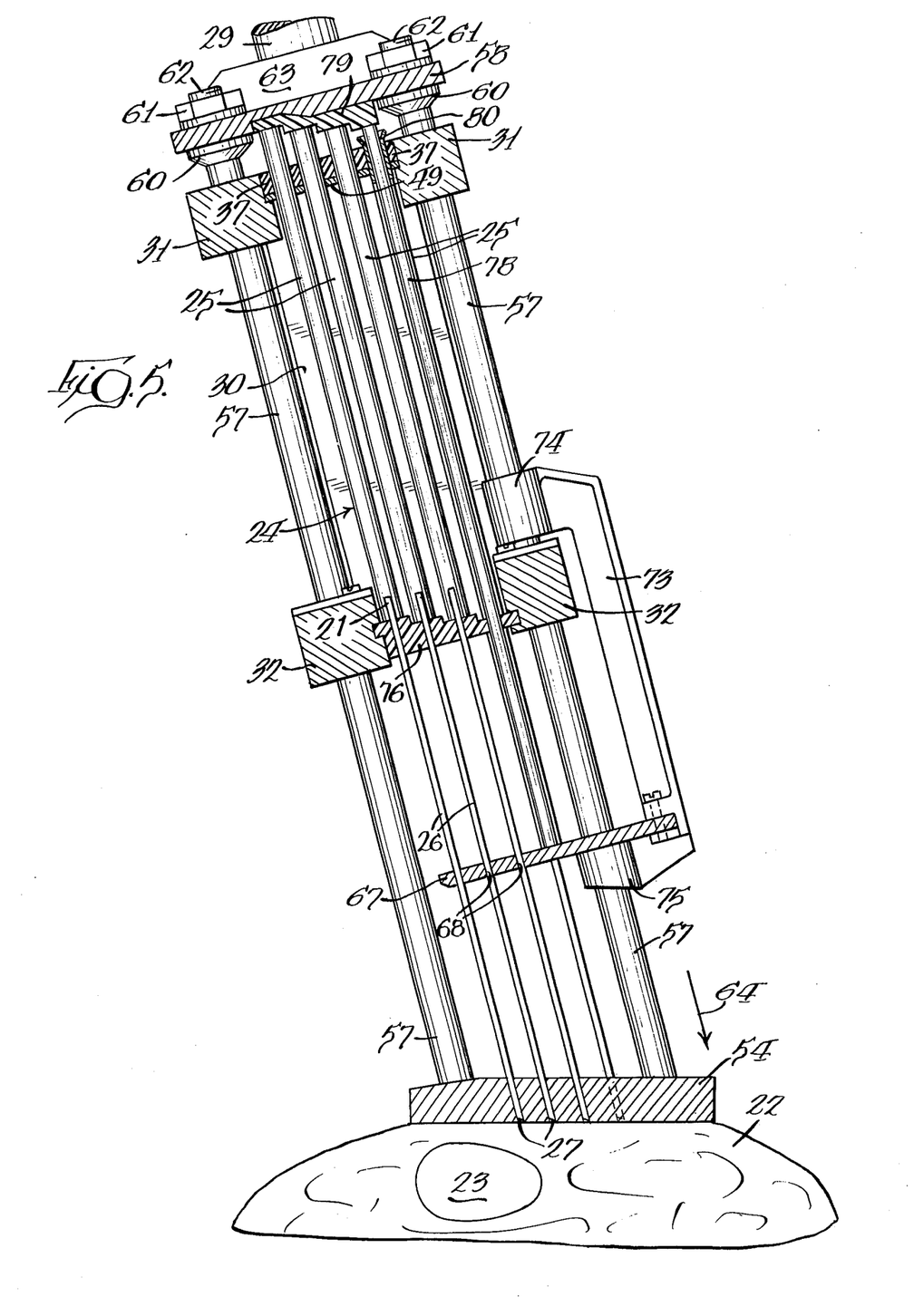
FIG. 5 is a vertical sectional view taken substantially along line 5—5 of FIG. 4 and showing the position of the knives and blade stabilizer means at the beginning of the meat penetratingstroke, the meat being illustrated at 22.

The apparatus of the embodiments disclosed and described herein are for tenderizing meat 22 that may contain bones as illustrated at 23 in FIG. 5. Each knife therefore is force yieldable and the knives are in sets each comprising a piston 25 on the lower end of which are attached a plurality, here shown as a pair, of knife blades 26. Each pair of knife blades is spaced apart and parallel to the longitudinal axis of its piston 25.

Each blade 26 is elongated and has opposite ends one of which comprises a sloped cutting end and the other of which 21 is attached to one side of the lower end of the piston 25. Thus each knife 24 comprises an elongated piston 25 and a plurality (here shown as a pair) of elongated knife blades 26 on opposite sides thereof with each piston and its knives substantially parallel. Such a knife structure with force yieldable means is described and claimed in the above U.S. Pat. No. 3,842,464.

Figure 6:
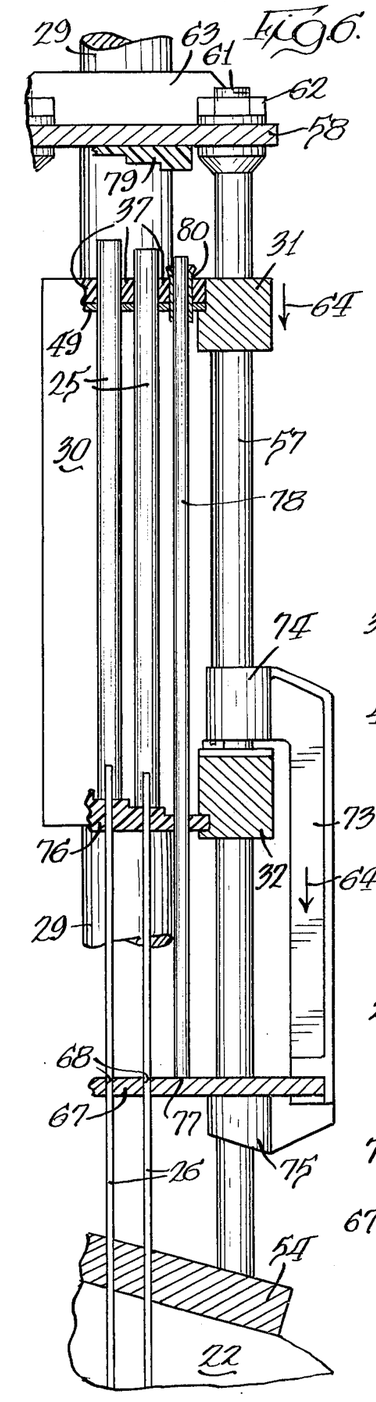
FIG. 6 is a view similar to FIG. 5 but angled vertically upwardly for illustrating the positions of the apparatus shortly after the beginning of the penetration of the meat.
Figure 7:
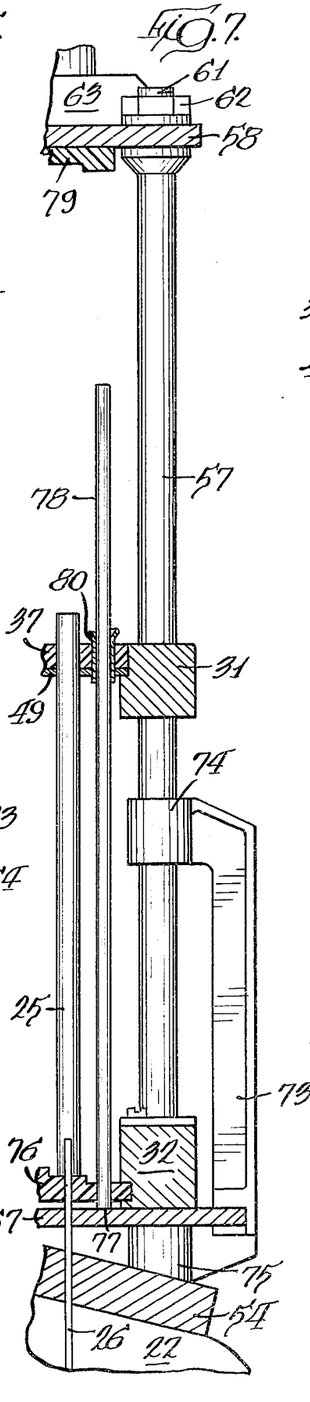
FIG. 7 is a view similar to FIG. 6 but showing the completion of the meat penetration.
Figure 8:
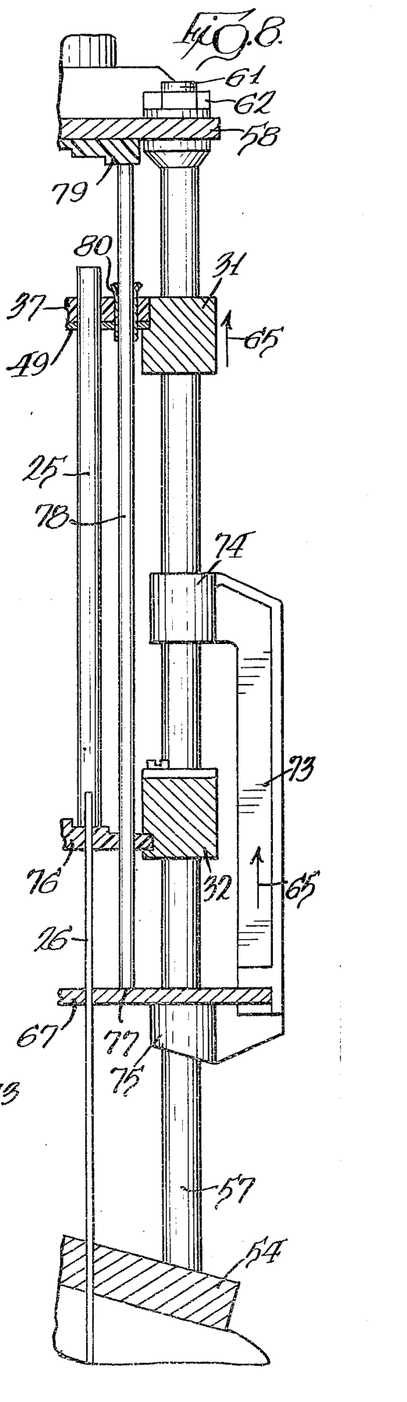
FIG. 8 is a view similar to FIGS. 5–7 but illustrating the positions during the withdrawal of the knives from the meat.

The tenderizing apparatus 20 comprises means for reciprocating the knives to project and withdraw the cutting edge ends 27 into and from the meat on a retainer embodied in the conveyor 14. FIG. 5 illustrates the position of the blades 26 and associated structure preparatory to projecting the blades into the meat 22 while FIGS. 6-8 illustrate the projecting and withdrawing of the blades from the meat.

In the illustrated embodiment the means for reciprocating the knives in this manner into and out of the meat to cut the fibers and tissues therein comprises spaced knife operating heads 28 angled toward each other of which only one is shown. Each head is slidably mounted for reciprocation on parallel guide rods 29 on opposite sides of the conveyor 14. Each head 28 comprises slide blocks 30 that are the elements slidable generally vertically but at an angle on the rods 29 and the blocks 30 are connected by opposite pairs of upper 31 and lower 32 (FIGS. 2 and 5) parallel metal bars bolted to the slide blocks 30 in order to provide for secure reciprocation.

The device 20 comprising the slide blocks 30 and the two pairs of rigid interconnecting bars 31 and 32 are reciprocated generally vertically but at an angle on the guide rods 29 by oppositely located drive rods 33 each having a head 34 hingedly connected to a pin 35 projecting outwardly from each of the slide blocks 30.

Figure 3:
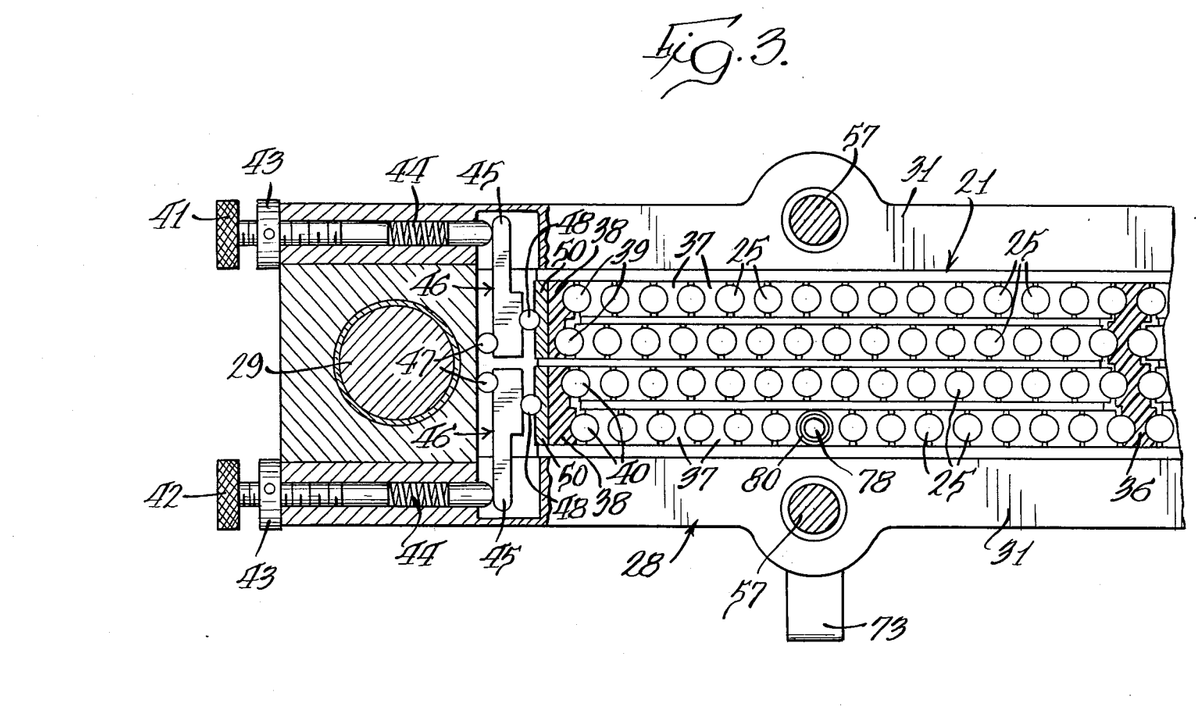
FIG. 3 is a fragmentary horizontal section taken substantially along line 3—3 of FIG. 4 illustrating the yieldable knife arrangement of this embodiment.

In order to apply a yieldable force when a blade of an individual knife strikes a bone a friction structure is provided as illustrated semi-schematically in FIG. 3. This yieldable structure comprises a stationary center friction block 36 at about the center of the device 20 and a series of spaced friction blocks 37 arranged on opposite sides and closely embracing the linear series of pistons 25 of which four such linear series are illustrated in FIG. 3.

In the embodiment of FIG. 3 the friction pressure of the movable mounting blocks 37 on the sides of the pistons 25 is adjustable by providing pressure blocks 38 each engaging an end pair of pistons 39 and 40 in the series. This pressure is varied by adjusting screws 41 and 42 each having a lock collar 43 and each bearing against a spring 44. Each of the screw 41 and 42 and spring 44 combinations applies pressure to one end 45 of a second cross lever 46 that is fulcrumed on a roller 47 at the opposite end of the lever 46 to apply pressure to a second roller 48 which in turn bears against a pressure plate 50 to apply pressure to the corresponding pressure block 38. This applies compressive force to the corresponding friction blocks 37 and thereby provides an adjustable friction force to the knife pistons 25. A similar arrangement (not shown) is provided on the opposite end of the structure of FIG. 3.

FIG. 2 illustrates the operating structure including the knives and the hold-down arrangement corresponding to an earlier version and without the blade stabilizer all as disclosed in the above Wagner U.S. Pat. No. 3,991,439. The remaining figures of the drawings illustrate a later version so that some of the parts have slightly different configurations from the corresponding parts of the earlier version of FIG. 2. However, where the parts are of corresponding structure and function in the embodiments of FIGS. 1 and 3-10 the same numerals are used.

Figure 4:
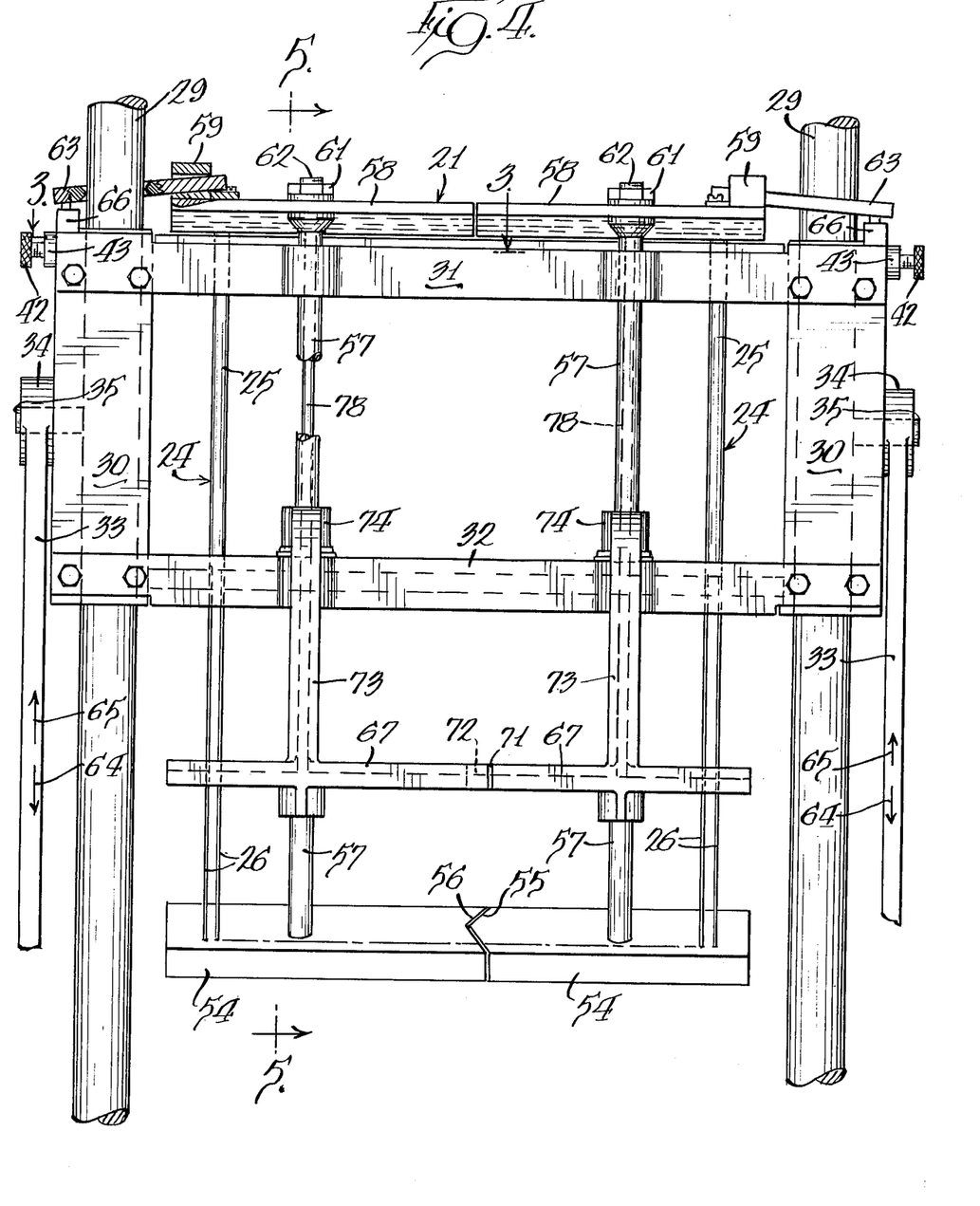
FIG. 4 is a fragmentary side elevational view of the knife drive and stablilizer means portion of the invention with only two representative knives being shown instead of the entire set for clarity of illustration.

FIG. 4 is a fragmentary elevational view illustrating a tenderizing device 20 of this invention. In FIG. 4 only two end knives 24 are illustrated although it should be understood that there will be a large number of knives as illustrated in FIGS. 2 and 3. Each knife 24, of course, includes the piston 25 and the pair of parallel knife blades 26 on opposite sides thereof.

The blades have their lower ends extending through the meat retaining plates 54 that are arranged end-to-end with nesting V-shaped end surfaces 55 and 56. These meat retaining plates 54 are adapted to engage the meat 22 and hold it down on the conveyor 14 while the knives 24 are being withdrawn as indicated by the right-hand plate 54 in FIG. 2.

Each meat retaining plate 54 as shown in FIG. 4 is mounted on the end of a rod 57 that is slidably held in one pair of upper and lower bars 31 and 32. As shown in FIG. 5 a pair of rods 57 is provided for each plate 54. The upper ends of these rods 57 are each attached to an upper reset plate 58 by being bolted thereto by nuts 61 engaging the threaded upper ends 62 of the rods 57 to hold each plate 58 clamped against a collar 60 on each rod 57.

The other ends of the reset plates 58 are each provided with a rockable lock plate 64 each of which is held at one end in a hinge bracket 59 on the corresponding reset plate 58. With this arrangement as the slide blocks 30 and the knives 24 movable therewith are moved down as indicated by the arrows 64 the retaining plates 54 move downwardly with the knife blades 26 to engage the meat 22. When a plate 54 engages the meat as shown in FIG. 2 the descending of the corresponding reset plate 58 stops and the corresponding lock plate 63 assumes a downward angle as shown at the right-hand side of FIG. 2 and in FIG. 4 to lock by friction jamming on the corresponding guide rod 29. Then, as the drive rods 33 reverse the motion as illustrated by the arrow 65 to raise the knife blades 26 from meat penetration the angled lock plates 63 each hold the corresponding retaining plate 54 against the meat until the top projection 66 which is spring loaded engages the outer end of the corresponding lock plate 63 and levels it at generally a right angle to its guide rod 29 thereby permitting the retaining plate 54 to be raised to the top meat retaining position along with the ascending knives.

The knife blades 26 of the sets of knives extend through a blade stabilizer member or plate 67 by passing through small openings 68 therein. This blade stabilizer means as shown comprises two such plates 67 for each device 20 as illustrated in FIG. 4. These stabilizer plates 67 also have spaced closely adjacent ends 71 each of which is arranged in a V surface similar to the arrangement of the surfaces 55 and 56 of the retainer plates 54.

These blade stabilizer plates 67 of the stabilizer means are located intermediate the lower 27 and upper 21 ends of the blades 26 at the time the blades begin to penetrate the meat as shown in FIG. 5 in order to resist lateral bending of the blades. Thus each stabilizer plate 67 is initially positioned a selected distance, about one-half the blade length in the embodiment shown in FIG. 5, from the cutting ends 27. This means for positioning in the illustrated embodiment comprises a generally vertical shallow U-shaped bracket 73 for each plate 67 having its upper end 74 slidable on a rod 57 and the lower end 75 is attached to an edge of a stabilizer plate 67. The result of this is that as the bars 31 and 32 and the knives 24 are moved downwardly 64 toward the meat the stabilizer plates 67 are also moved downwardly by their supporting brackets 73 which are slidable on their respective rods 57.

As can be seen, the friction blocks 37 are retained between the top bars 31 on support plates 49 and are adjustable as previously described relative to the pistons 25 in order to provide a selected desired amount of frictional resistance to the knives through their pistons 25. In order to provide lateral stability to these knives the lower ends of the pistons are against the top stepped surface of a blade guide strip 76 through which the blades extend. This strip 76 is fixedly retained between the lateral pair of lower bars 32 as shown in FIG. 5.

With the structure as described the sequence of operations is illustrated in FIGS. 5-8. Here as the slide blocks 30 (which are omitted from FIGS. 7 and 10) are lowered as shown by the arrow 64 the meat retaining plates 54 first contact the top surface of any meat 22 that is in the tenderizing station 19. Then continued downward movement 64 of the blade structure will project the knife blades 26 to penetrate the meat as shown in FIG. 6 and the positioning of the stabilizer plates 67 intermediate the ends of the blades will resist any tendency to lateral bending of the thin blades.

Continued downward movement causes the blades to be driven deeper into the meat because of the engagement of the friction blocks 37 with the knife pistons 25. The stabilizer plates 67 and their supporting brackets 73 will move downwardly with the downwardly driven blades 26. This downward movement of the plates 67 and brackets 73 is caused by the combined forces of gravity and the friction of the blades 26 against the plates 67 where the blades extend through the plate openings 68. At the bottom of the meat penetrating stroke as shown in FIG. 7 the stabilizer plate 67 will be adjacent to the retaining plate 54 and the blades 26 will be in full meat penetrating projected position.

On the return stroke 65 (FIG. 8) plate positioner rods 78 will reach and engage the bottom of the stepped bumper strip 79 (FIG. 8) and hold each stabilizer plate 67 in its proper intermediate position relative to the blades 26 after the blades have been completely withdrawn as shown in FIG. 5. These rods 78 therefore serve to position the stabilizer plates 67 at the same intermediate position on the knife blades 26 at the completion of every upward stroke 65 in preparation for the next down stroke from the elevated position of FIG. 5. The brackets 73 and the corresponding plates 67 are lifted to the raised position of FIG. 8 by the friction of the ascending blades 26 engaging the plates 67 as previously described.

The operation of the apparatus in the embodiment of FIGS. 1-8 is as follows. Because the brackets 73 and thus the stabilizer plates 67 are slidable on the rods 57 the downward movement 64 of the slide blocks 30 and the structure added thereto that caused the blades 26 to penetrate the meat also permits the stabilizer plates 67 to move along with the descending bars 31-32 under the pull of gravity. The positioner rods 78 also move along with the descending blade structure. At the bottom of the stroke as shown in FIG. 7 where the blades 26 penetrate to their deepest the bottoms 75 of the brackets 73 are against the tops of the meat retaining plates 54 and the guide strip 76 is also adjacent the top of the stabilizer plates 67 where it is carried by the lower bars 32. Although the bottom end 77 of each positioner rod 78 is not attached to the stabilizer plate 67 the rod 78 is likewise carried along in this descent.

If one of the knife blades 26 should strike a bone 23 this blade that strikes the bone will not be damaged but the knife will stop and the corresponding friction blocks 37 will continue to descend along with the other blocks. Then, when the structure is raised to its initial elevated position of FIG. 5 the tops of all pistons 25 abut against the stepped surface of the bumper strip 79 of the reset plate 58 so that the bottom knife ends 27 of all the knives are again substantially horizontally aligned as shown in FIG. 5. At the same time the upper end of the positioner rod 78 also abuts against the bumper strip 79 to hold the stabilizer plates 67 in their initial positions which in this embodiment are about midway of the length of the blades 26. In these positions the parts are ready for the next down stroke 64 in the meat tenderizing cycle.

Figure 9:
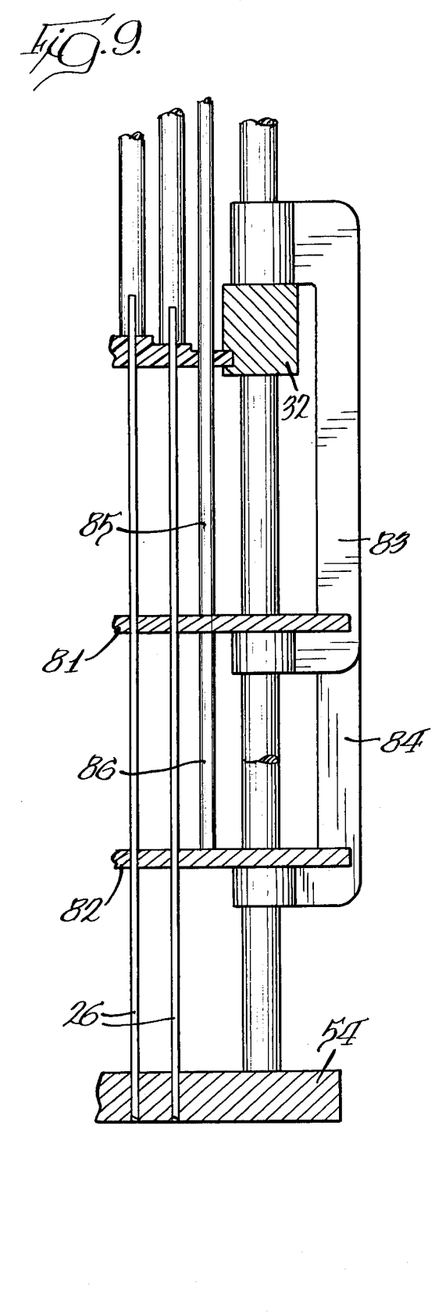
FIG. 9 is a fragmentary view similar to FIG. 7 but illustrating a second embodiment where a plurality, here shown as two, of blade stabilizers are employed for longer blades.
Figure 10:
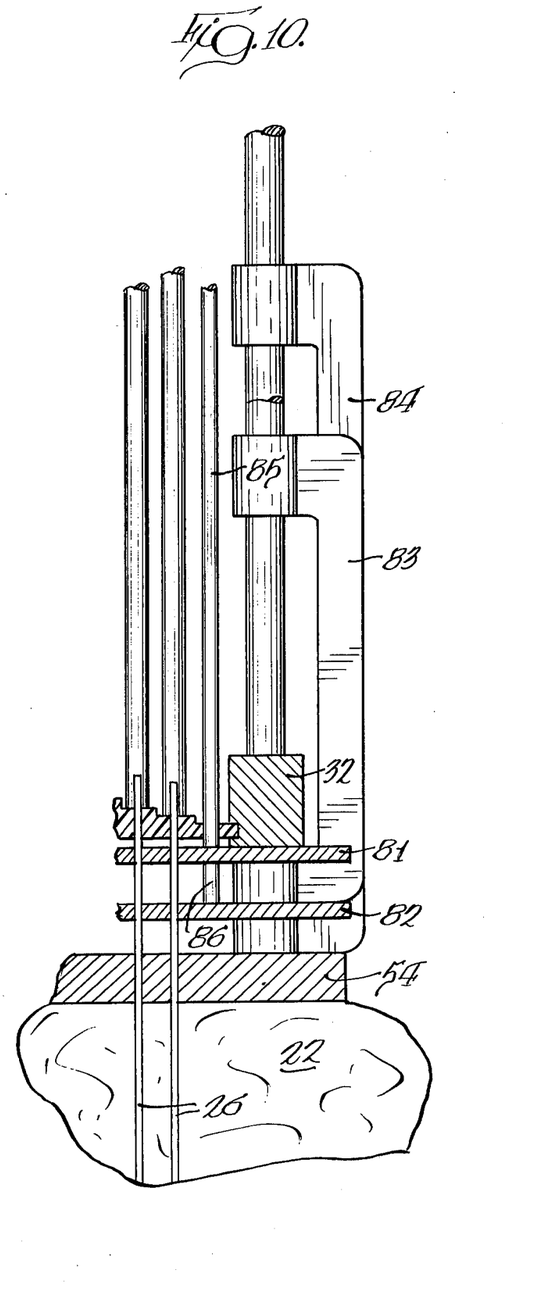
FIG. 10 is a view similar to FIG. 9 but illustrating the positions at the completion of the meat penetrating portions of the tenderizing stroke.

In the embodiment of FIGS. 4-8 there is illustrated only one stabilizer plate 67 for each knife. This is satisfactory where the knife blades are of ordinary length such as 9 inches. However, where longer blades are used, and a good example of this is blades of about 15 inches length, two or more stabilizer plates may be used. This is illustrated in the embodiment of FIGS. 9 and 10 where there are two such stabilizer plates 81 and 82 each held by its own bracket 83 and 84 and functioning in exactly the same manner. Here, where the knives 26 are fully inserted into the meat 22 the plates 81 and 82 are collapsed to adjacent each other and to adjacent the meat retaining plate 54. In this embodiment each of the two stabilizer plates 81 and 82 has its own positioner rod 85 and 86, respectively. Otherwise the operating parts are the same and the operation is the same.

Having described our invention as related to the embodiments shown in the accompanying drawings, it is our intention that the invention be not limited by any of the details of description, unless otherwise specified, but rather be construed broadly within its spirit and scope as set out in the appended claims.

We claim:

1. Apparatus for tenderizing meat, comprising: a conveyor for the meat; a plurality of knives each comprising an elongated blade having opposite ends one of which comprises a sharp cutting end for penetrating the meat and severing toughening fibers and tissues in the meat into short pieces; means for reciprocating said knives for projecting and withdrawing said blades into and from meat on said conveyor, each blade being subject to lateral bending between said ends under stress of the type resulting from resistance to said penetrating; a meat retaining means engaging the top of the meat and through which said blades extend; locking means for locking said retaining means against the meat during said withdrawing; means for thereafter releasing said locking means and thus said retaining means from said meat; a blade stabilizer means in addition to said meat retaining means comprising a stabilizer member engaging each of said blades intermediate said blade ends and above said retaining means at the beginning of said penetrating for supporting said blades against said lateral bending; means for positioning said stabilizer member at said intermediate position and at a selected distance from said blade cutting ends and said retaining means at said beginning of said penetrating; means for moving said stabilizer member simultaneously with said knives toward said meat during said beginning of said penetrating; and means for halting said moving of said stabilizer member for projecting said blades further beyond said stabilizer member during completion of said penetrating.

2. The apparatus of claim 1 wherein said means for positioning said stabilizer member maintains said selected distance until said distance of penetrating of said cutting ends into the meat of any blades that do not strike an obstruction is substantially equal to said selected distance.

3. The apparatus of claim 1 wherein said stabilizer means also comprises a mounting member carrying said stabilizer member and there are provided means for positioning said mounting member on said means for reciprocating for movement therewith during said beginning of said penetrating.

4. The apparatus of claim 3 wherein means are provided for yieldably retaining said mounting member on said means for reciprocating during said retracting.

5. The apparatus of claim 4 wherein there are also provided stop means engaged by said mounting member during the terminal portion of said retracting for positioning said stabilizer member at said selected distance and thereby comprising said means for positioning preparatory to the next reciprocation of said knives.

6. The apparatus of claim 1 wherein said stabilizer member comprises a plate having openings therein through which said knives are slidably retained.

7. The apparatus of claim 1 wherein there are provided a plurality of said stabilizer means each comprising a said stabilizer member and said means for positioning said stabilizer members comprises means for retaining said members spaced along said blades prior to said reciprocation of said knives into said meat.

8. The apparatus of claim 1 wherein said blades are substantially flat with each cutting end being angled with respect to the longitudinal axis of its said blade and all blades being substantially parallel.

9. The apparatus of claim 8 wherein said stabilizer member comprises a flat plate having narrow openings corresponding in shape and dimensions to the corresponding cross sectional area of each said blade and with all said openings being correspondingly substantially parallel.

10. Apparatus for tenderizing meat, comprising: a conveyor for the meat; a plurality of knives each comprising an elongated blade having opposite ends one of which comprises a sharp cutting end for penetrating the meat and severing toughening fibers and tissues in the meat into short pieces; means for reciprocating said knives for projecting and withdrawing said blades into and from meat on said conveyor, each blade being subject to lateral bending between said ends under stress of the type resulting from resistance to said penetrating; a meat retaining means engaging the top of the meat and through which said blades extend; locking means for locking said retaining means against the meat during said withdrawing; means for thereafter releasing said locking means and thus said retaining means from said meat; a blade stabilizer means in addition to said meat retaining means comprising a stabilizer plate engaging each of said blades intermediate said blade ends and above said retaining means at the beginning of said penetrating for supporting said blades against said lateral bending, said stabilizer plate having openings in which said blades are slidable; means for positioning said stabilizer plate at said intermediate position and at a selected distance from said blade cutting ends and said retaining means at said beginning of said penetrating and for maintaining said selected distance until said distance of penetration of said cutting ends into the meat of any blades that do not strike an obstruction is substantially equal to said selected distance; means for moving said stabilizer plate simultaneously with said knives toward said meat during said beginning of said penetrating; and means for halting said moving of said stabilizer plate for projecting said blades further beyond said stabilizer plate during the completion of said penetrating.

11. The apparatus of claim 10 wherein said blades are substantially flat with each cutting end being angled with respect to the longitudinal axis of its said blade and all blades being substantially parallel.

* * * * *